(12) United States Patent
Ruiz

(10) Patent No.: US 10,655,549 B2
(45) Date of Patent: May 19, 2020

(54) ENGINE CONFIGURATION FOR PERFORMING COMPRESSION AND EXPANSION IN A SINGLE CYLINDER

(71) Applicant: Francisco Ruiz, Chicago, IL (US)

(72) Inventor: Francisco Ruiz, Chicago, IL (US)

( * ) Notice: Subject to any disclaimer, the term of this patent is extended or adjusted under 35 U.S.C. 154(b) by 0 days.

(21) Appl. No.: 16/371,742

(22) Filed: Apr. 1, 2019

(65) Prior Publication Data

US 2019/0301379 A1    Oct. 3, 2019

Related U.S. Application Data

(60) Provisional application No. 62/651,283, filed on Apr. 2, 2018.

(51) Int. Cl.
*F02D 35/02* (2006.01)
*F02D 28/00* (2006.01)
*F02D 13/02* (2006.01)
*F02D 15/04* (2006.01)

(52) U.S. Cl.
CPC ....... *F02D 35/023* (2013.01); *F02D 13/0276* (2013.01); *F02D 15/04* (2013.01); *F02D 28/00* (2013.01)

(58) Field of Classification Search
CPC ....... F01L 1/34; F01L 1/36; F01L 1/44; F01L 1/46; F01L 9/04; F01L 2009/0401; F01L 13/0015; F01L 2013/113; F01L 2201/00; F01L 2800/06; F01L 2800/14; F01L 2820/042; F02B 21/00; F02D 13/0276; F02D 15/04; F02D 41/3094

USPC .................................. 123/90.1, 90.11, 90.15
See application file for complete search history.

(56) References Cited

U.S. PATENT DOCUMENTS

| | | | |
|---|---|---|---|
| 2005/0182553 A1* | 8/2005 | Miller | F01L 1/46 701/103 |
| 2006/0207257 A1* | 9/2006 | Turner | F01B 17/02 60/712 |
| 2007/0245982 A1* | 10/2007 | Sturman | F02B 21/00 123/26 |
| 2011/0023820 A1* | 2/2011 | Donitz | F01L 13/04 123/316 |
| 2012/0186249 A1* | 7/2012 | Guzzella | F02B 21/00 60/612 |
| 2012/0324884 A1* | 12/2012 | Reuss | B60K 6/12 60/613 |

(Continued)

*Primary Examiner* — Jorge L Leon, Jr.
(74) *Attorney, Agent, or Firm* — Vitale, Vickrey, Niro, Solon & Gasey LLP

(57) ABSTRACT

The present disclosure relates to an engine in which compression and expansion is performed in the same cylinder. Also disclosed is a microprocessor for controlling the state of various valves in the cylinder—including an intake valve, a transfer valve, and an exhaust valve—to cause a compression or expansion to occur. A compression tank is provided for receiving, via the transfer valve, compressed air, which may be retrieved during an expansion (combustion) cycle. Compressed air for from multiple consecutive compressions may be stored in the tank and retrieved later, including for multiple consecutive expansions. Compression and expansion are not required to occur in any fixed or predetermined pattern and the microprocessor may evaluate vehicle sensors to determine a power demand, and cause compression or expansion to occur depending on the given power demand.

13 Claims, 14 Drawing Sheets

(56) References Cited

U.S. PATENT DOCUMENTS

2015/0167565 A1\* 6/2015 Lee ...................... F02D 17/026
                                                        123/559.1

\* cited by examiner

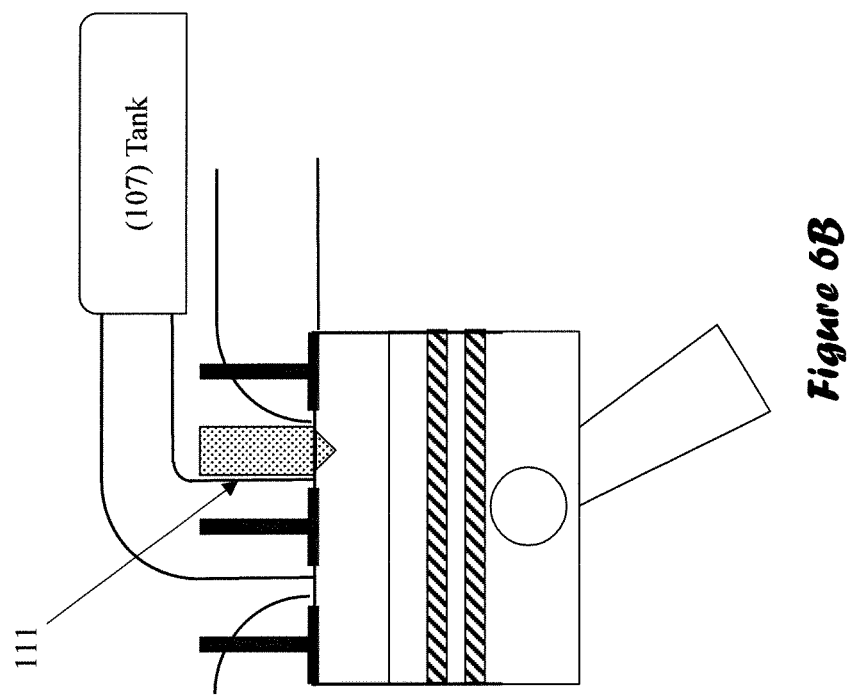
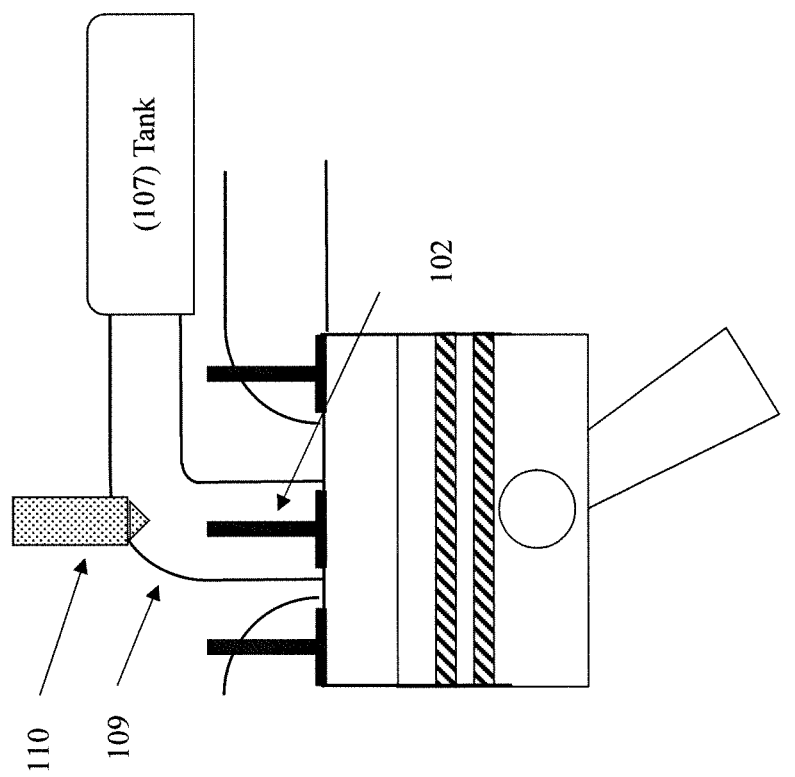

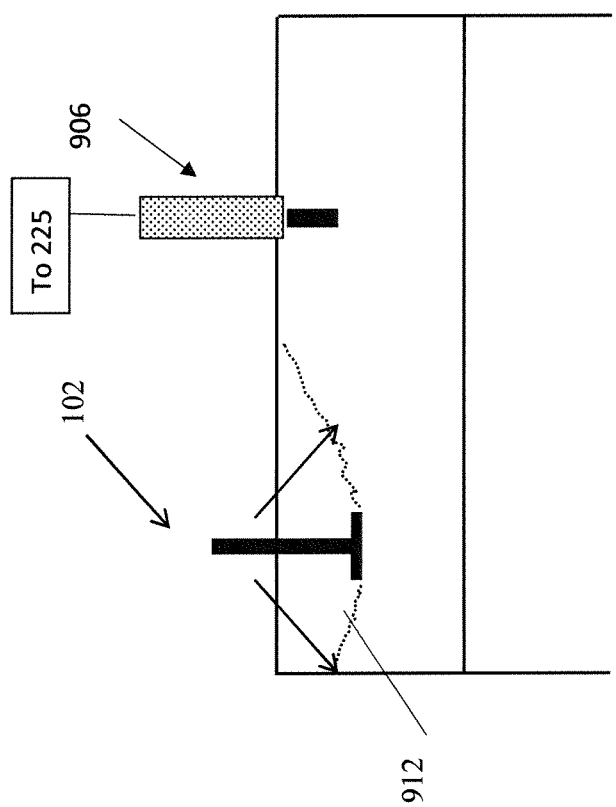
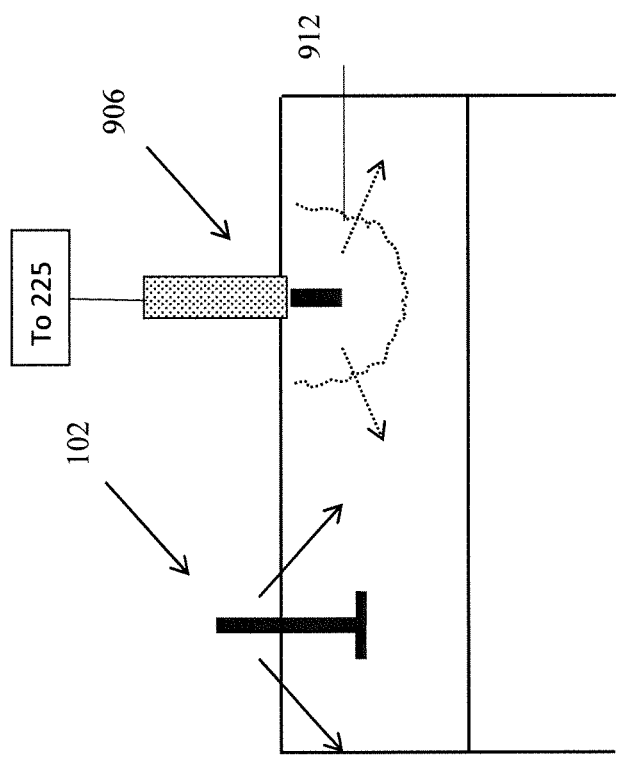
*Figure 9A*
*Figure 9B*

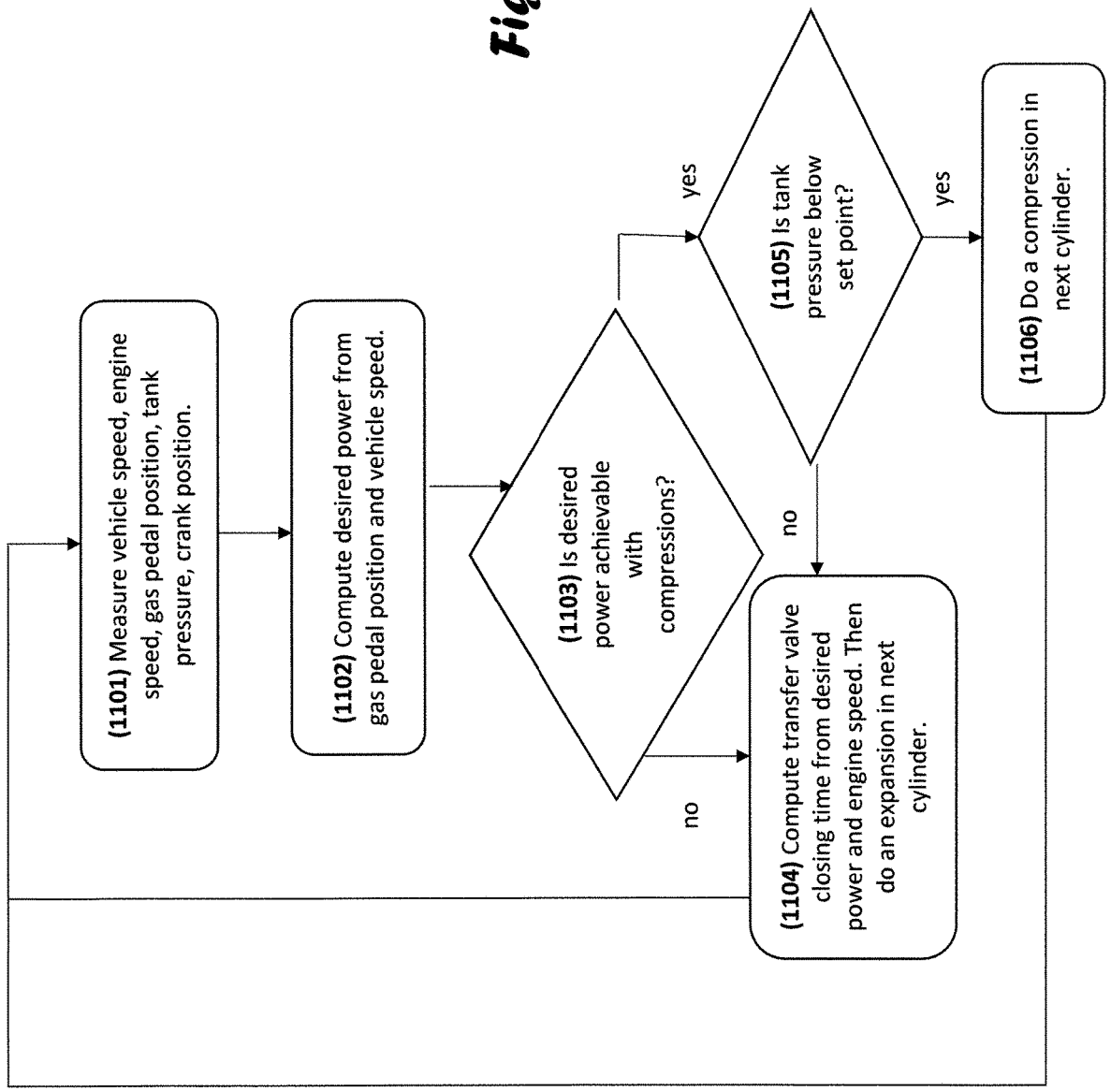

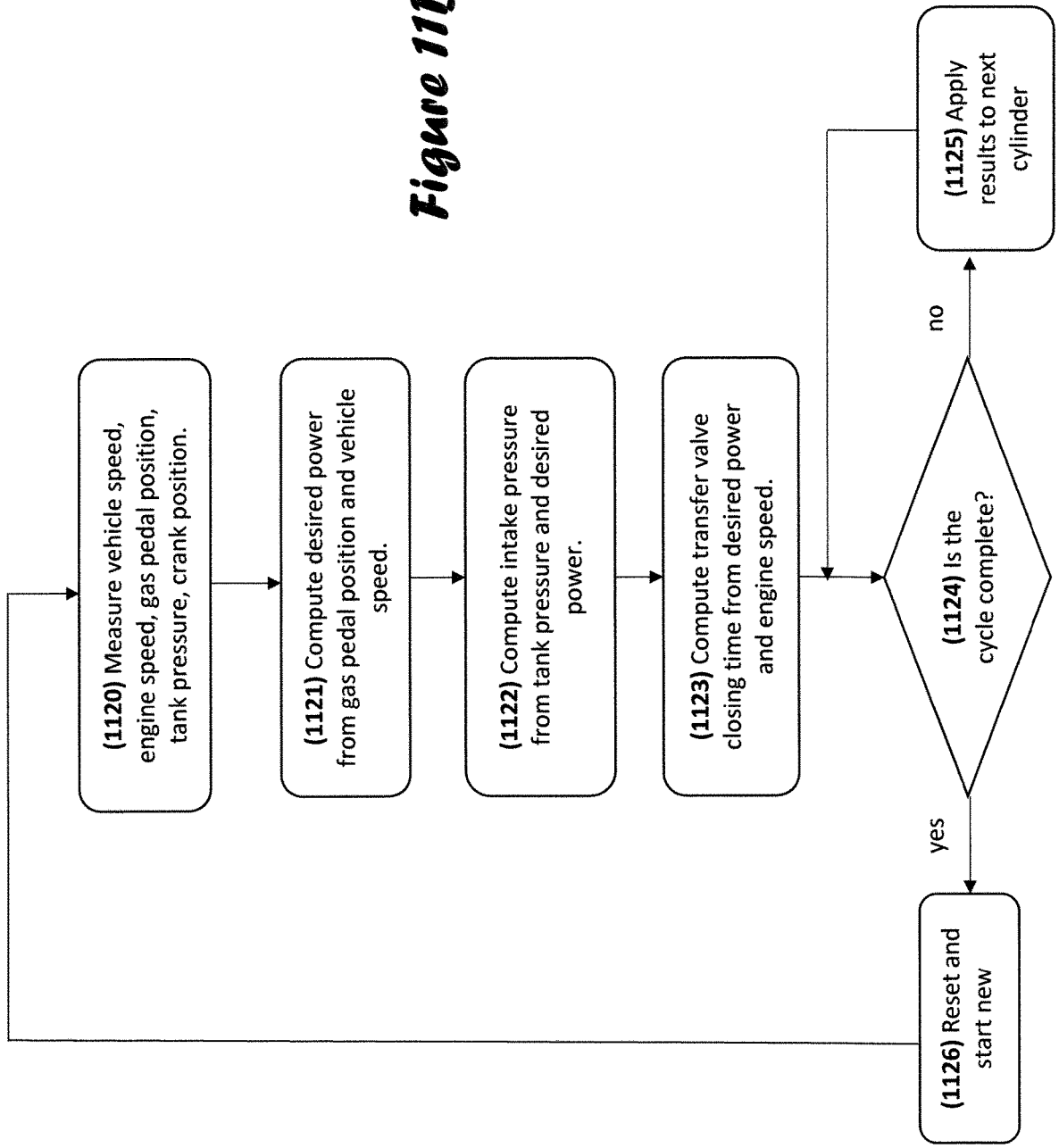

ENGINE CONFIGURATION FOR PERFORMING COMPRESSION AND EXPANSION IN A SINGLE CYLINDER

STATEMENT OF PRIORITY

This patent application claims the benefit under 35 U.S.C. § 119(e) of U.S. Provisional Patent Application Ser. No. 62/651,283, filed by Applicant on Apr. 2, 2018, and having the title "Adaptive Cycle Engine." This provisional patent application is hereby expressly incorporated by reference, in its entirety, as part of the present disclosure as if fully set forth herein.

FIELD OF THE INVENTION

The present inventions relate to an internal combustion engine, having a compression tank and controlled by a microprocessor, in which the compression and expansion phases occur within the same cylinder.

DESCRIPTION OF RELATED ART

Conventional two- and four-stroke internal combustion engines have multiple disadvantages, including that they may suffer from a lack of expansion volume. This may occur regardless of whether ignition is caused by spark, fuel injection, or an accelerating chemical reaction. In particular, at the end of an expansion phase, the pressure within the cylinders is typically higher than atmospheric pressure, resulting in a loss of work as compared to the work which could have been obtained if the gases in the cylinder had been allowed to expand all the way to atmospheric pressure before being exhausted.

Prior art efforts have attempted to disclose engines in which the expansion volume is larger than the compression volume, but such efforts were unsuccessful because they introduce other disadvantages. For example, the Atkinson engine attempts to use a special mechanism for making the expansion stroke longer than the compression stroke, but the Atkinson engine has been unsuccessful in practice. Likewise, in the Miller engine, the effective compression volume is reduced relative to the expansion volume by changing the timing of the intake valve, which has the disadvantage of losing power density as compared to conventional engines.

Other prior art efforts are directed to split-cycle machines, including so-called Scuderi and/or Tour machines. Such engines use separate cylinders for compression and expansion (as in the Brayton engine). This split-cycle design allows for an expansion volume larger than the compression volume, but introduce other disadvantages. For example, by its nature, an expansion cylinder will always run hotter than a compression cylinder, which leads to mechanical and/or lubrication problems. In addition, spark ignition will lead to worsening detonation. Further yet, in such designs, the power density is also lower than in conventional engines because two sets of cylinders are needed in order to complete each cycle.

The present inventions solve the problems of the prior art, and provide additional advantages. Embodiments of the inventions described herein provide the advantage of increases power density because compression and combustion can be performed in the same cylinder. Moreover, an additional advantage is improved cooling of the engine and improved fuel economy. Additional advantages are discussed herein and will become apparent to a person of ordinary skill in the art having the benefit of the present disclosure.

BRIEF SUMMARY OF THE INVENTIONS

The inventions include engines having cylinders for performing compression and expansion within the same cylinder. Such a cylinder may have an intake valve, a transfer valve, and an exhaust valve. These valves may be controlled by electronic signals sent from a microprocessor for controlling their respective states. In some embodiments, the intake and exhaust valves are controlled respectively by a cam, while the transfer valve is controlled by the microprocessor. A compression tank is also provided for storing and retrieving compressed air depending on the engine's power demand.

For example, in some embodiments, an engine comprises at least one cylinder having a cylinder top, and a piston disposed within the cylinder and connected to a crank; an intake valve, a transfer valve, and an exhaust valve each position at the cylinder top; wherein the transfer valve is in operable communication with a transfer manifold, and the transfer manifold is connected to a compression tank; a microprocessor operably connected to control the intake valve, the transfer valve, and the exhaust valve between an open position and a closed position; a crank position sensor in operable communication with the microprocessor and configured to signal the position of the crank to the microprocessor; and a power demand sensor in operable communication with the microprocessor and configured to signal a current power demand to the microprocessor.

In some embodiments, the microprocessor is adapted and configured to initiate a first compression cycle by opening the intake valve to allow air to flow into the cylinder as the piston moves from a top dead center (TDC) position to a bottom dead center (BDC) position; to close the intake valve as the piston reached its BDC position; and to open the transfer valve to allow compressed air to move to the compression tank as the piston returns to its TDC position.

Embodiments of the inventions may further provide a fuel injector in electronic communication with the microprocessor and positioned within the transfer manifold, and a spark ignition positioned within the cylinder and in electronic communication with the microprocessor.

To initiate combustion, in embodiments of the inventions, the microprocessor may be adapted and configured to initiate a first combustion cycle, subsequent to the first compression cycle, by signaling the fuel injector to inject fuel, opening the transfer valve to cause air to flow from the compression tank in to the cylinder, and energizing the spark ignition.

Embodiments of the inventions also include methods for performing compression and expansion in a single cylinder. Exemplary steps include establishing electronic communication between a microprocessor and an intake valve, a transfer valve, and an exhaust valve, wherein the intake valve, the transfer valve, and the exhaust valve are positioned on the top of a cylinder, and the cylinder contains a piston connected to a crank; connecting the transfer valve to a transfer manifold, and connecting the transfer manifold to a compression tank for storing compressed air; and establishing electronic communication between the microprocessor and a crank position sensor for determining the relative position of the piston within the cylinder.

Further yet, embodiments of the inventions include the steps of using the microprocessor to initiate a first compression cycle by causing the intake valve to open and allow air to enter the cylinder when the piston is at a top dead center (TDC) position; allowing the piston to move toward a bottom dead center (BDC) position; using the crank position sensor to sense when the piston reaches the BDC position; and opening the transfer valve as the piston returns from the BDC position towards a TDC position to allow compressed air to flow, via the transfer manifold, to the compression tank.

Additional embodiments of the inventions include using the microprocessor to initiate a first combustion cycle by causing the transfer valve to open and allow air from the compression tank to enter the cylinder when the piston is at a TDC position; using the microprocessor to communicate with a fuel injector positioned in the transfer manifold, and causing the fuel injector to inject fuel through the transfer valve and into the cylinder; and using the microprocessor to communicate with a spark ignitor positioned within the cylinder, and causing the spark ignitor to ignite the mixture of fuel and air.

As will become apparent with the benefit of the present disclosure, it is an objective of the inventions to provide an engine with improved performance and improved fuel economy. In some aspects, it is an objective of the inventions to store unneeded energy in the form of compressed air in a compression tank, and retrieve to retrieve such compressed air during a time of high power demand.

It is an objective of the inventions to provide improved aspects of an engine without requiring additional energy-conversion components, such as electric motors, generators, or batteries.

It is an additional objective of the inventions to increase power density of an engine's cylinders by performing compression and combustion within the same cylinder. An additional objective is to provide an engine whose cylinders can perform varying patterns and orders of compression and compression cycles. Further yet, some embodiments of the invention provide improved cooling characteristics by using the compression cycle to cool a cylinder after a combustion cycle.

In additional aspects, it is an objective of the inventions to provide an engine whose cylinder(s) have an expansion volume greater than the compression volume, without sacrificing power density.

Additionally, it is an objective of embodiments of the inventions to provide improved engine characteristics in a design which is suitable for use in automotive vehicles, including, without limitation, in passenger vehicles.

DRAWINGS

FIG. 6A is a side view of embodiments of the inventions wherein a fuel injector is positioned in the transfer manifold.

FIG. 6B is a side view of embodiments of the inventions having a fuel injector directly injecting fuel into a cylinder.

FIG. 9A shows exemplary flame propagation within a cylinder in embodiments of the inventions.

FIG. 9B is shows exemplary flame propagation within a cylinder in embodiments of the inventions.

FIG. 11A shows an exemplary flow chart of a microprocessor configuration of executing a cycle and determining the next cycle.

FIG. 11B shows an exemplary flow chart of a microprocessor configuration of executing a predetermined pattern of compression and expansion cycles.

DETAILED DESCRIPTION OF THE PREFERRED EMBODIMENTS

Before any embodiments of the inventions are explained in detail, it should be understood that the inventions are not limited in their application of the details of construction and/or arrangement of components set forth in the following description or illustrated in the following drawings. The inventions are capable of other embodiments and of being practiced or being carried out in various ways. Also, it is to be understood that the phraseology and terminology used herein for the purpose of this description should not be regarded as limiting in any manner, unless expressly stated.

The following discussion is presented to enable a person skilled in the art to make and use embodiments of the inventions. Various modifications to the illustrated embodiments will be readily apparent to those of skilled in the art, and the principles disclosed herein may be applied to other embodiments and applications without departing from the scope of the invention. Thus, embodiments of the inventions are not intended to be limited embodiments but are to be accorded the widest scope consistent with the principles and features disclosed herein.

The present disclosure is generally directed to an engine cylinder for achieving full expansion of the combustion products and thus achieving increased power density. The engine of the present disclosure is suitable for all uses in which engines are used. In some instances, the engine is used in passenger vehicles, such as mid-sized cars—but the disclosure is not limited to such uses and the present inventions are equally suitable in other vehicles.

In one aspect of the inventions, it is contemplated that compression and expansion may occur in the same cylinder, thus achieving twice (i.e., double) the power density as a split-cycle machine. Alternatively, embodiments of the invention may achieve equal power density as a split-cycle machine while using only half the number of cylinders (and thus, only half the space). In addition to increased power density, embodiments of the present inventions have the advantage of running cooler than split-cycle machines because the compression cycle cools the cylinder after an expansion cycle. Further yet, embodiments of the invention may also include a storage tank for storing compressed air during periods of lesser power demand, which allows the stored energy to be used at a subsequent period of higher power demand. As will become apparent, embodiments of the present inventions can be implemented without requiring additional energy-conversion components, such as additional electric motors, generators, or batteries.

Figure 1:
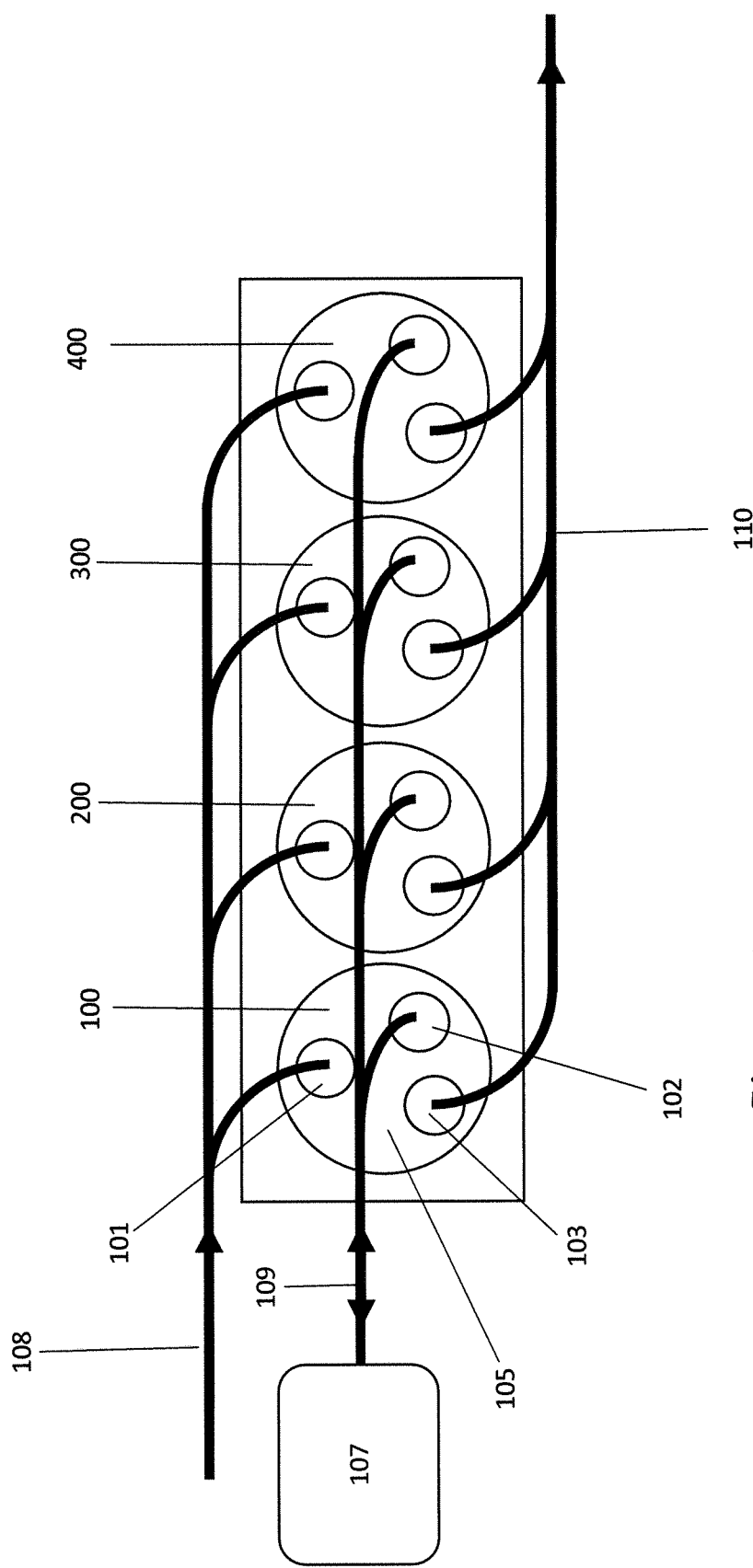
FIG. 1 is a top view of an embodiment of the inventions wherein an engine has four cylinders connected to an intake manifold, a transfer manifold and a compression tank, and an exhaust manifold.

Turning first to FIG. 1, an exemplary embodiment of the inventions is shown from a top view. In the example of FIG. 1, an engine comprises four cylinders, 100, 200, 300, and 400. It is contemplated that each cylinder 100, 200, 300, and 400 is substantially identical. As seen with respect to cylinder 100, it is contemplated that cylinders of the present inventions may include an intake valve 101, a transfer valve 102, and an exhaust valve 103. The valves may be conventional valves, controlled by a microprocessor or electronic control unit, as are known in the art. For example, known engine valves have variable timing, wherein the timing mechanisms may include cams actuated by electromagnetic, pneumatic, or hydraulic forces. Although it may be desirable that the timing of all valves be variable, only the transfer valve 102 must necessarily be a variable timing valve. Unless otherwise indicated, the present disclosure is not intended to be limited to any specific valve.

The intake valve 101 is connected to an intake manifold 108; the transfer valve 102 is connected to a transfer manifold 109; and the exhaust valve 103 is connected to an exhaust manifold 110. Likewise, additional cylinders (such as exemplary cylinders 200, 300, and 400) may be connected to the manifolds in an identical configuration. In some configurations, the cylinders may be configured in v-blocks or boxer engines. It is contemplated that the manifolds may be split into several parts or pieces, one for each cylinder head, and then re-joined at a location further away from the engine.

As also seen in FIG. 1, transfer manifold 109 is in operable communication with compression tank 107. Compressed air (resulting from a compression cycle in one or more cylinders) may be passed, via transfer manifold 109, to tank 107. Thus, tank 107 is configured to store compressed air, which may be released (e.g., returned to the same cylinder) at a later time where the engine is required to deliver more power. Tank 107 may be any type of tank suitable for storing compressed air. In the context of a mid-sized passenger vehicle, such a tank may be a 12 gallon tank capable of withstanding 70 bar pressure.

Figure 2:
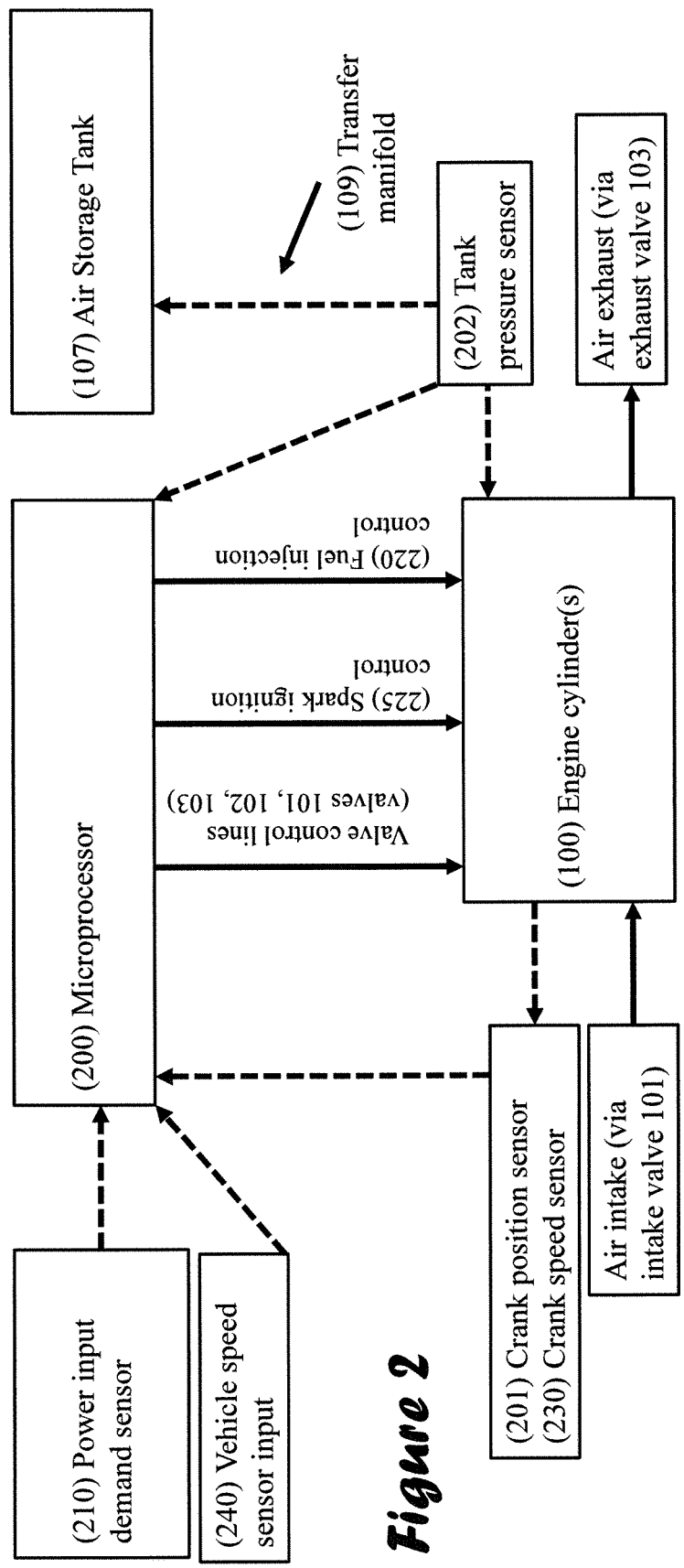
FIG. 2 is a schematic showing a microprocessor in electronic communication with various sensors and control lines for controlling valves on a cylinder.

FIG. 2 shows an exemplary schematic including a microprocessor 200 for controlling the valves of at least one cylinder, such as cylinder 100. It is understood that additional cylinders having the same configuration may be provided. In engines having additional cylinders (such as 200, 300, and 400 in FIG. 1), such additional cylinders are likewise provided with the same connections and configurations. Microprocessor 200 may be any known microprocessor, PIC (programmable integrated circuit), electronic control unit, or any other electronic device capable of executing instruction. It should be understood that microprocessor 200 is connected to power (battery, or otherwise) and may be in electronic communication with a memory (internal or external) for storing instructions, status, indicators, or any other transitory and/or non-transitory computer signals. In some embodiments, the present disclosure provides a microprocessor 200 which changes the state of various components, such as valves, ignitors, and spark plugs, at various times and phases, and it should be understood that all such instructions may be written as a computer program or computer software and stored at a memory for execution by microprocessor 200.

FIG. 2 is a schematic depicting possible connections and communications between valves, sensors, and the like, and is not intended to limit the position, or configuration, of depicted components. FIG. 2 shows microprocessor 200 in operable communication with intake valve 101, transfer valve 102, and exhaust valve 103. As will become apparent from the present disclosure, in some embodiments of the invention, microprocessor 200 is in operable communication with the valves (101, 102, and 103) via control lines, wireless connections, or any other known means for communicating with valves. In the instance of control lines, a single control line may be provided to control all three valve states, or each valve may be controlled by a separate control line. Via such control lines or other connections, microprocessor 200 is configured and adapted to control the timing and position (e.g. open or closed) of intake valve 101, transfer valve 102, and exhaust valve 103. Throughout this disclosure, it should be understood that references to microprocessor 200 "opening" or "closing" a valve is intended to mean that microprocessor 200 sends an appropriate signal via a control line for causing the relevant valve to open or close. In embodiments of the present invention, microprocessor 200 causes valves to open and close in a manner that enables compression and expansion to occur in the same cylinder, and, depending on the power demanded, air from the compression cycle may be transferred to air storage tank 107 and retrieved at a later time. In addition to controlling the three valves of a cylinder, microprocessor 200 is further in operable communication with a fuel injection control 220 and spark ignition control 225, which allow microprocessor 200 to control the rate and timing of fuel combustion.

Also seen in FIG. 2 are various inputs to microprocessor 200, wherein such inputs may be used to determine the timing and positioning of valves. Such inputs to microprocessor 200 may signal the status and state of various know vehicle sensors, such as vehicle speed 240. Another exemplary input is the power demand input 210, which measures the power demanded by a vehicle's driver (wherein the driver may be a human driver, or a computer/AI power driver). The power demand input 210 may communicate via a control line from a vehicle's gas pedal, cruise control, or any other known mechanism by which power can be demanded. It should be understood that pushing a gas pedal is one such example (but not the only example) which can result in an increased demand for power. In some circumstances, described further herein, microprocessor 200 responds to an increased demand for power by releasing compressed air from tank 107 back into the cylinder 100 for combustion. Further yet, tank pressure sensor 202 is in operable communication with microprocessor 200 to communicate the air pressure within tank 107. Microprocessor 200 may be configured to evaluate the pressure reading from tank pressure sensor 202 to determine how much compressed air is available in tank 107, and to control relevant valves in a manner that delivers additional compressed air during period of increased power demand. Moreover, microprocessor 200 may evaluate the pressure reading from tank pressure sensor 202 to ensure that Additional inputs to microprocessor 200 include crank position sensor 201, which is a known sensor for signaling the position of the crank within the cylinder. That is to say, crank position sensor 201 may indicate when the cylinder's piston is at top dead center (sometimes referred to as "TDC"), bottom dead center (sometimes referred to as "BDC"), or anywhere else in the piston's cycle. As will become apparent from the present description, the relative positioning of the piston within the cylinder is relevant to the timing and control of intake valve 101, transfer valve 102, and exhaust valve 103, as well as to the spark control 225 and fuel control 220.

Figure 3:
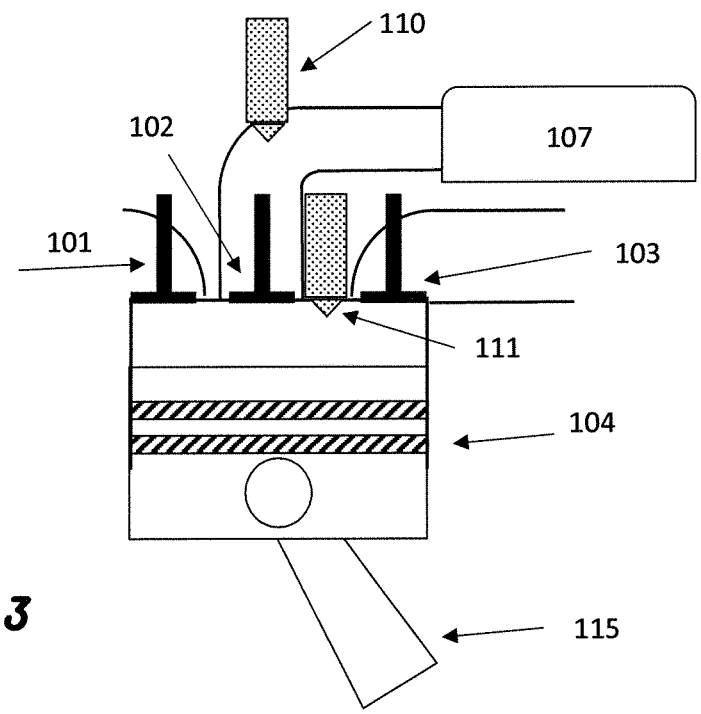
FIG. 3 is a side view of a cylinder having an intake valve, a transfer valve, and an exhaust valve according to some embodiments of the inventions.

Turning now to FIG. 3, a cylinder 100 is shown from a side perspective. Previously described intake valve 101, transfer valve 102, and exhaust valve 103 are seen at the cylinder's top. The valves control the flow of gases in and out of the cylinder 100. Fuel injectors 110 and 111 are also shown. Fuel injector 110 is configured inside transfer manifold 109. Fuel injector 111 injects fuel directly into the cylinder (sometimes called direct-injection). A person of ordinary skill in the art would understand that spark plugs (not shown) may also be provided. Although FIG. 3 shows two fuel injectors 110 and 111, it should be understood that most designs only comprise a single fuel injector. Thus, fuel injectors 110 and 111 are alternatives to each other and it is not necessary to include both fuel injectors in embodiments of the inventions.

FIG. 3 further shows piston 104 for driving connecting rod 115, which, in turn, is connected to a crankshaft (not shown) or similar mechanism for enabling the transmission of mechanical power. Piston 104 is shown to have a flat head, but it should be understood that its shape can vary so long as the minimum volume within the cylinder is as small as possible when the piston reaches its TDC position. Moreover, piston 104 should have a shape that avoids collisions between moving parts. Crank position sensor 201 (see FIG. 2) measures the position of the piston 104 within the cylinder.

Figure 4:
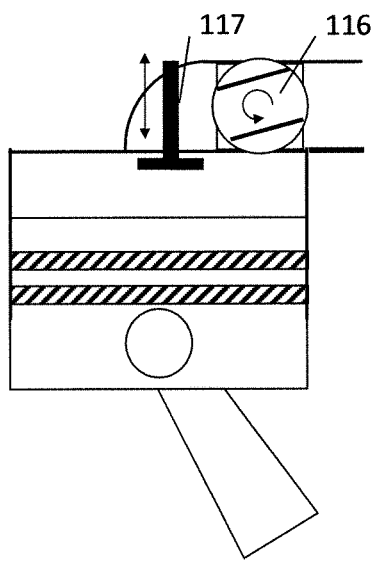
FIG. 4 is a side view of embodiments of the inventions wherein the transfer valve is a rotary valve in series with a poppet.

An alternative valve configuration is shown in FIG. 4. In particular, FIG. 4 shows a specific design for alternate transfer valve, wherein transfer valve 102 (e.g. FIG. 1) has been replaced with a rotary valve 116 (positioned within the transfer manifold 109) and connected to a poppet valve 117. An objective of this embodiment is to provide an improved cam design for the transfer valve. It should be understood that the amount of time that a transfer valve remains open is small relative to the time an intake or exhaust valve remains open. The embodiment of FIG. 4 addresses this concern by providing a rotary valve 116 placed in series with poppet valve 117. The rotary valve rotates at half camshaft speed, so that it may be in the open position every time the poppet valve 117 is open. However, rotary valve 116's phasing may be so that the times when rotary valve 116 is open do not coincide with those times that poppet valve 117 is open, or that they overlap only partially. In this way, the phase difference between the camshaft and the rotary valve 116 effectively controls when the set of the two valves allows flow to pass. Continuously variable phasing can be achieved by means of a differential or planetary gear set placed between the shafts moving each valve, which in turn is actuated by the electronic controller, or directly by the operator.

Figure 5:
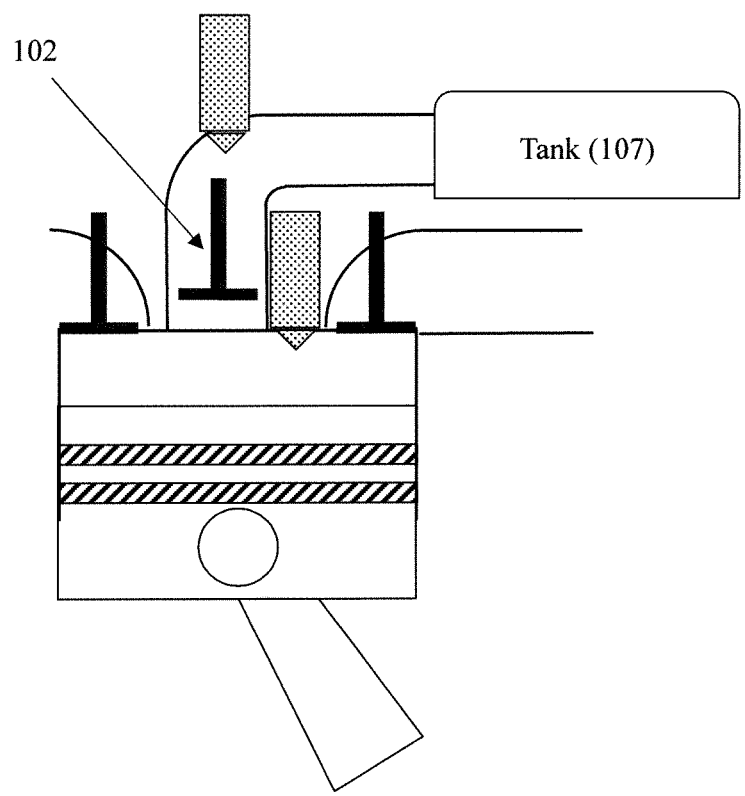
FIG. 5 is a side view of embodiments of the inventions wherein the transfer valve is opened to the outside of the cylinder.

Another embodiment is shown in FIG. 5. There, transfer valve 102 is constructed to open outward from the cylinder. Such an embodiment provides multiple advantages. For example, opening outwardly allows transfer valve 102 to better seal the transfer manifold 109 since its pressure is higher than the pressure in the cylinder during most of the cycle. Outward opening also prevents a collision between the transfer valve 102 and the piston 104 at its TDC position, so that a smaller clearance volume can be used. Further yet, such a configuration creates an inwardly-directed flow of the mixture (e.g. fuel and oxygen) entering the cylinder, which may lead to a more stable stationary flame for the final combustion phase.

With respect to FIGS. 6A and 6B, the discussion turns to alternative designs for fuel injectors 110 and 111. It should be understood that spark plugs (not show) are provided in the cylinder, if combustion is to be initiated by a spark. Ignition of sparks is controlled by microprocessor 200, in communication with spark ignition control 225. In FIG. 6A, a fuel injector 110 is shown injecting fuel into the transfer manifold 109 such that fuel enters the cylinder together with the air (i.e. oxygen) when the transfer valve is open. In FIG. 6B, the fuel injector 111 injects fuel directly into the cylinder. Both configurations are within the scope of the contemplated inventions. In some instances, it may be advantageous to mix fuel and air before providing a spark (as in FIG. 6A). However, in such embodiments, fuel injection must be timed such that no fuel is carried towards the storage tanks. The configuration of FIG. 6B provides less time for air and fuel to mix, but it is the preferred configuration for designs wherein fuel is going to ignite to burn, forming a diffusion flame, such as in a diesel engine.

The discussion now turns to the configuration of microprocessor 200. In embodiments of the inventions, microprocessor 200 is configured to receive inputs shown in FIG. 2 and, accordingly, control the three valves 101, 102, and 103, fuel injection 220, and sparks 225, to operate one or more cylinders (e.g. 100, 200, 300, 400, etc). In embodiments of the inventions, the manner in which microprocessor 200 controls the cylinder's valves and other control lines causes compression and expansion to occur in the same cylinder. Rather than requiring that each compression be followed by combustion, as in typical engines of the prior art, microprocessor 200's control over the valves, and ability to store and retrieve compressed air, allows microprocessor 200 to perform nearly any combination of compression and/or combustion cycles in any sequence. That is to say, it is not necessary for the two cycles to immediately follow each other and scenarios exist in which consecutive compression cycles (or, consecutive expansion cycles) may occur.

Figure 7B:
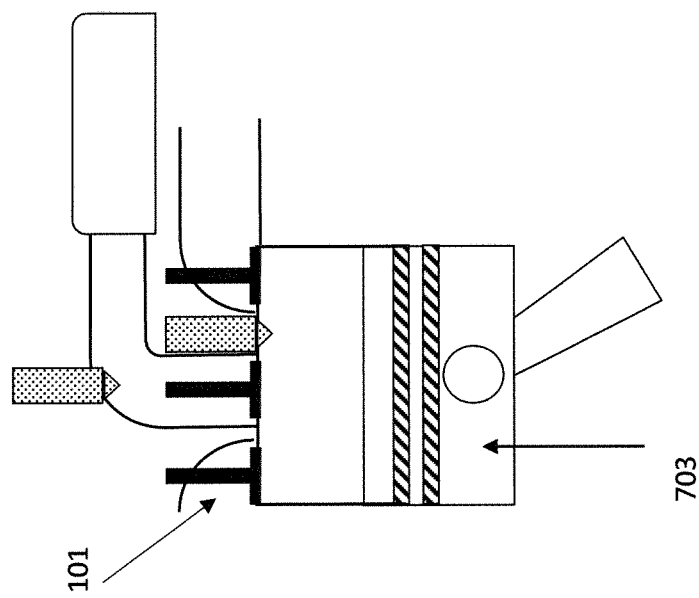
FIG. 7B is a side view of embodiments of the inventions showing the piston moving towards a top dead center position (TDC).
Figure 7A:
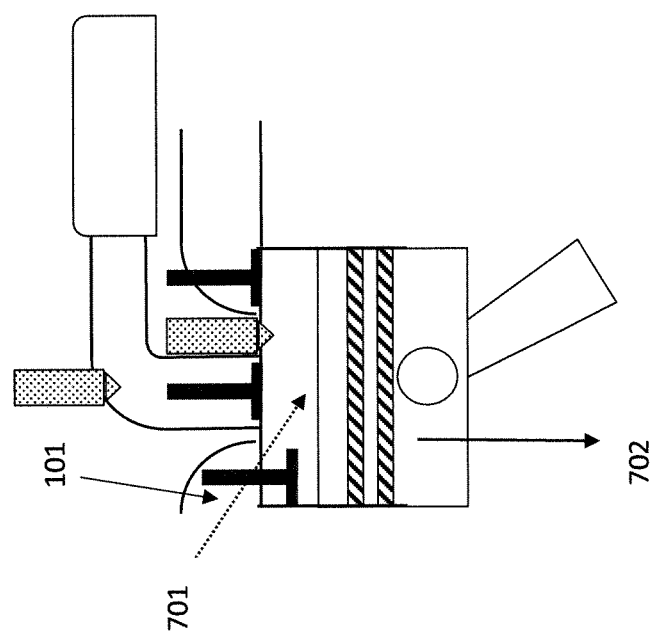
FIG. 7A is a side view of embodiments of the inventions showing the intake valve in an open state and the piston moving towards a bottom dead center position (BDC).

Microprocessor 200 receives a signal from crank position sensor 201 which indicates where piston 104 is positioned. It is understood that piston 104 moves up and down between a bottom dead center (BDC) position and a top dead center (TDC) position (each move is sometimes referred to as a stroke). To begin a compression cycle, microprocessor 200 opens intake valve 101 when piston 104 is sensed to be at, or near, its TDC position. As intake valve 101 opens, air can flow into the cylinder as piston 104 moves downward (i.e. piston 104 has reached TDC and is moving back "down," relative to the figures herein). This state may be referred to as the "intake" state. FIG. 7A is illustrative of this state: reference number 701 is indicative of the open position of intake valve 101, and reference number 702 is indicative of piston 104 moving downwards, away from TDC and towards BDC. Only a small amount of internally recirculated exhaust exists at this phase, because the volume trapped inside the cylinder (at TDC position) is as small as possible. FIGS. 7A-7G illustrate various states of the cylinder.

As microprocessor 200 senses (via crank position sensor 201) that the piston 104 is at, or near, BDC, the microprocessor 200 signals to close the intake valve 101. As the piston 104 again returns from BDC towards TDC, compression begins. This state of compression is illustrated in FIG. 7B, wherein valve 101 is shown to be closed and reference 703 indicates that piston 104 is returning "upwards," i.e. from BDC back towards TDC.

Figure 7D:
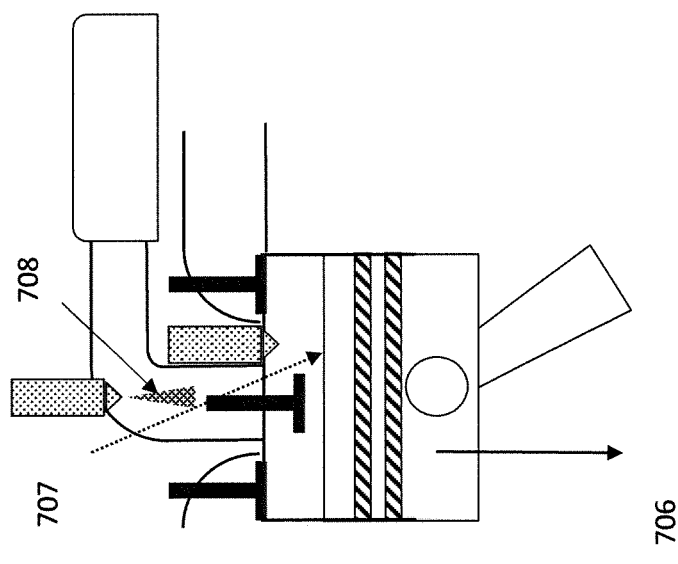
FIG. 7D is a side view of embodiments of the inventions showing a state in which the piston moved towards BDC, transfer valve is open, and fuel is injected into the transfer manifold.
Figure 7C:
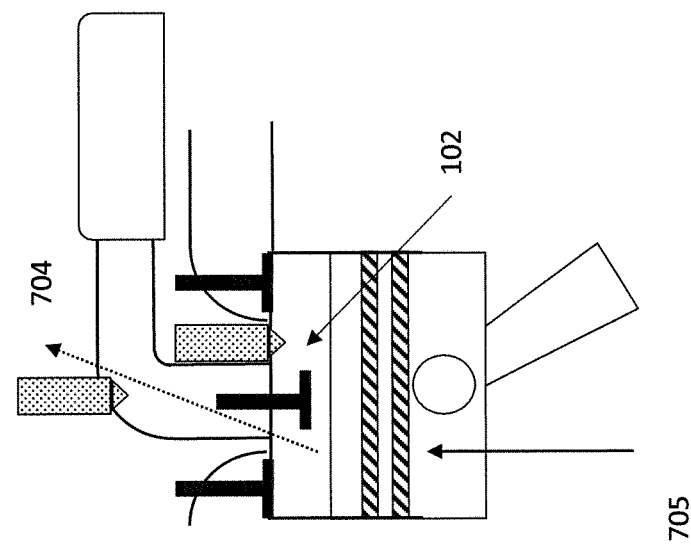
FIG. 7C is a side view of embodiments of the inventions showing a state in which the transfer valve is opened and the piston moves towards TDC, forcing compressed air into the tank.

Before the piston 104 returns to TDC, microprocessor 200 causes the cylinder to enter the "storage" state, wherein the compressed air is moved to tank 107 for storage. When the pressure within the cylinder is near the pressure in the transfer manifold (as evaluated by microprocessor 200, together with tank pressure sensor 201), microprocessor 200 may cause transfer valve 102 to open. Opening transfer valve 102 allows compressed air to travel, via the transfer manifold 109, to tank 107. Tank 107 stores the compressed air, which may subsequently be returned to the cylinder for expansion during a time period of relatively higher power demand. FIG. 7C is illustrative: it shows that piston 104 continues to move upwards to TDC. FIG. 7C further shows that, in this state, microprocessor 200 has signals for transfer valve 102 to be in the open position 704, thus allowing compressed air to escape into transfer manifold, and therefore into tank 107.

Once the piston 104 has returned to TDC, the compression stroke ends. Microprocessor 200 is adapted and configured to receive a power demand input 210. Depending on such input, microprocessor 200 is configured to either begin a second compression cycle (if power demand is relatively low), or otherwise to begin a combustion cycle. At this stage, microprocessor has completed the compression state and must determine whether to repeat a second compression state or proceed to a combustion cycle. Having the benefit of the present disclosure, it should be understood that the compression state is repeated when power demand is low and there is a need to increase tank pressure, whereas a combustion cycle is selected by microprocessor 200 in response to a period of relatively higher power demand.

To begin a combustion cycle, microprocessor 200 causes fuel injection to begin when the piston 104 is determined to be at TDC (for example, immediately following the compression cycle, which ends at TDC, as described above). As fuel is injected and piston 104 again moves away from TDC, air begins to return into the cylinder. At this point in the cycle, microprocessor 200 may energize a spark plug, thus causing the fuel to ignite and burn. FIG. 7D is illustrative of such a state: reference 706 indicates that the piston is on a down stroke, towards BDC, and 707 indicates that transfer valve 102 is open to allow air to return from tank 107. 708 is indicative of fuel being injected into the transfer manifold 109, thus causing the fuel to mix with air as air is returned into the cylinder.

Figure 7F:
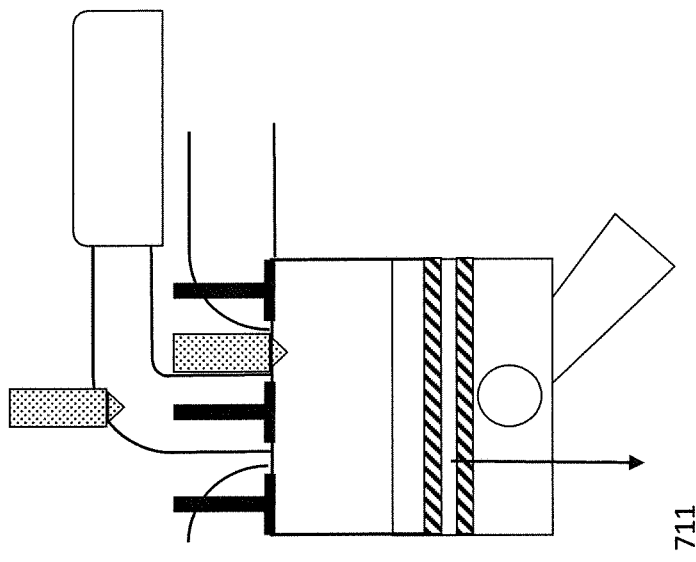
FIG. 7F is a side view of embodiments of the inventions showing a state in which a piston moves towards BDC.
Figure 7E:
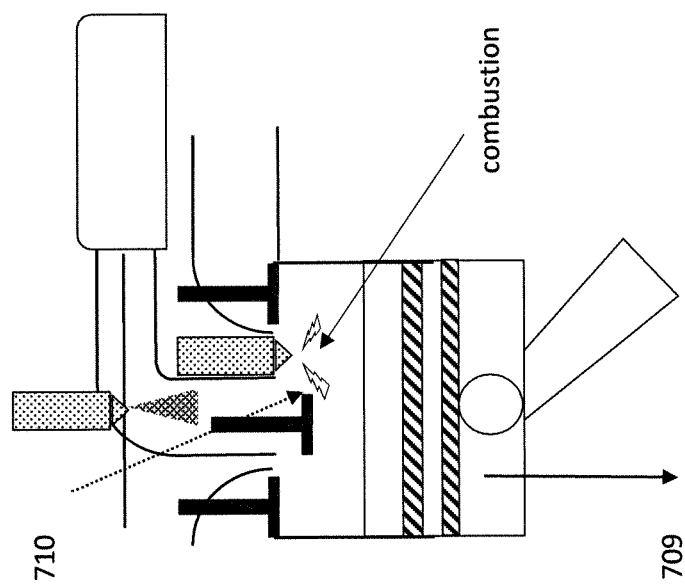
FIG. 7E is a side view of embodiments of the inventions showing a state in which a spark is energized to cause combustion.

Microprocessor may cause transfer valve 102 to close when an amount of air has returned into the cylinder that may be smaller, equal, or larger than the amount that was previously compressed. The ability to control power delivered during combustion by controlling the duration for which transfer valve 102 is open, is one advantageous aspect of the inventions. Compression can be achieved with minimal losses to friction and valve throttling, and the power produced by expansion may be fine-tuned through small variations of the transfer valve timing for greater operational smoothness. Because the time at which transfer valve 102 is closed may vary from cycle to cycle (depending on power demand at any instant), it is preferable that the transfer valve 102 be a valve with variable closing time. After the transfer valve 102 closes and the combustion is completed, expansion continues until the piston 104 is near BDC. FIG. 7E illustrates this combustion phase, wherein 709 indicates that piston 104 is continuing to move towards BDC. Also shown is 710, indicating that a spark is provided and fuel combustion occurs. FIG. 7F illustrates the end of the expansion phase, wherein the piston continues to move towards (see 711), and reaches, BDC, thus completing the combustion and expansion phases of a cycle.

Figure 7G:
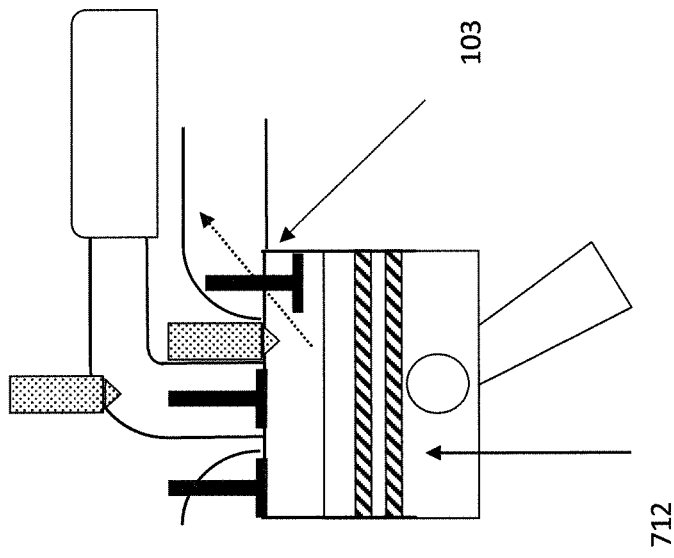
FIG. 7G is a side view of embodiments of the inventions showing a state in which a piston moves toward TDC and the exhaust valve is opened.

At that point, microprocessor 200 causes exhaust valve 103 to open, resulting in burned gases being expelled as piston 104 again moves from BDC towards TDC (712). When TDC is reached, the gases are exhausted and the expansion phase ends. This state is illustrated in FIG. 7G, wherein 712 indicates that piston 104 is returning from BDC towards TDC while exhaust valve 103 is shown to be opened by control of microprocessor 200. Exhaust gases escape the cylinder, the piston returns to TDC, and the cycle may begin over again. Microprocessor 200 determines whether a second consecutive expansion phase should begin (using compressed air from tank 107) if high power is demanded, or otherwise to begin a compression phase.

Power demand may be high, for example, when a vehicle performs a passing maneuver or while climbing a hill. Embodiments of the inventions have the advantage of producing only expansions during such a time period. This will be possible as long as there is sufficient air stored in the tank 107, before the pressure drops below a value that begins to compromise performance, which is typically around 50 bar. Likewise, when a vehicle is braking or descending a hill, the microprocessor 200 may control the engine's cylinders such that only compressions take place, and the energy of the vehicle is stored as air pressure, thus saving fuel. The capacity of the tank, therefore, is a function of the maximum power demand that is expected of the engine, and of its duration. As an example, Applicant's calculations show that a 1700 kg sedan running on the US06 duty cycle defined by EPA, will need about 40 liters of air storage at 70 bar. Tank 107 can withstand sufficient pressure to store compressed air from multiple consecutive compression cycles. As will become apparent, tank 107 stores sufficient compressed air from the compression cycle to subsequently be able to provide sufficient air for multiple consecutive expansion cycles. That is to say, because tank 107 stores sufficient energy in the form of compressed air, embodiments of the invention can perform multiple consecutive expansions, for example during a period of high power demand.

Figure 8:
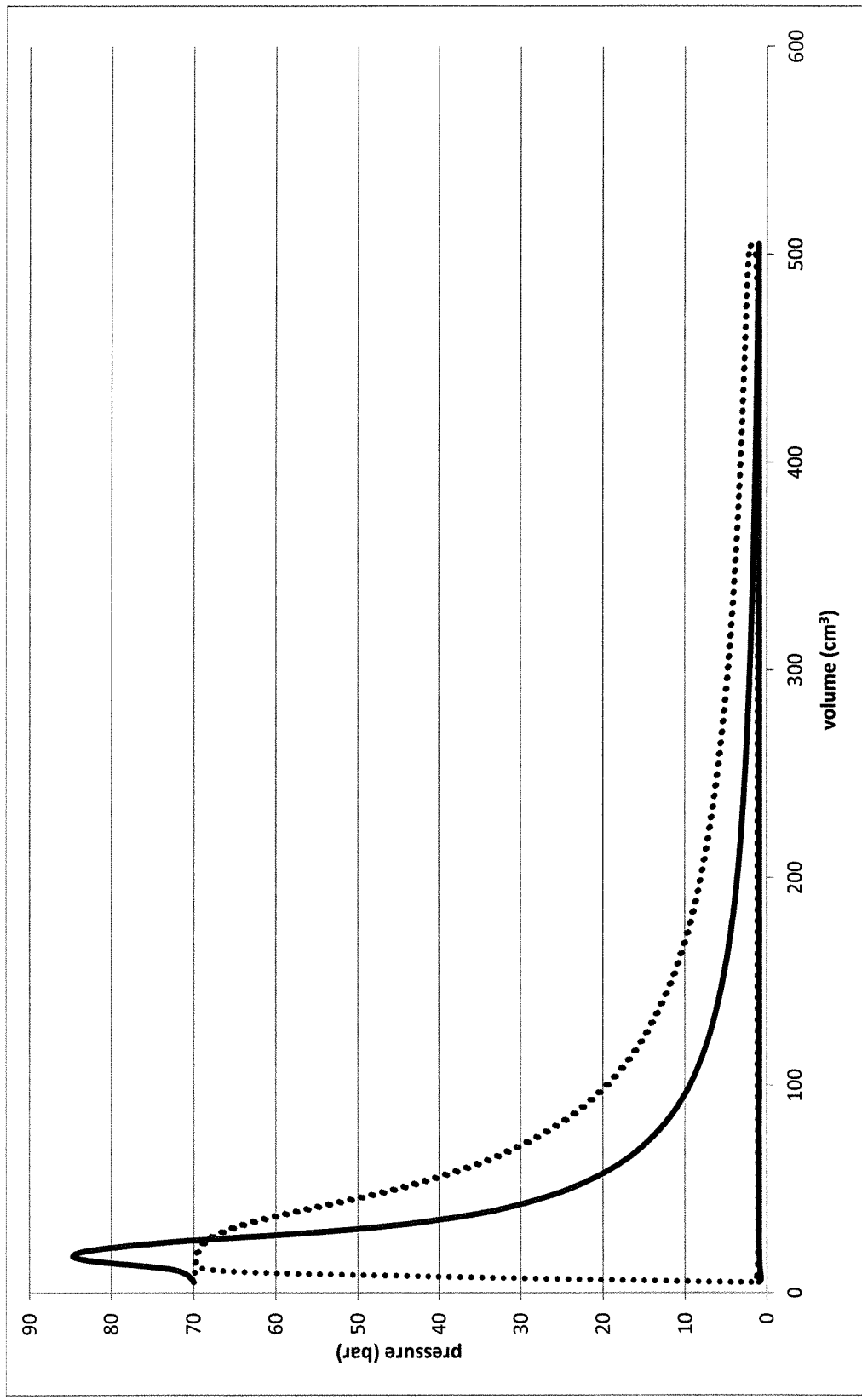
FIG. 8 is a graph showing Applicant's simulation of a pressure-volume diagram inside a cylinder in embodiments of the inventions.

FIG. 8 shows Applicant's simulation results of a pressure-volume diagram of the cycle(s) described above. In FIG. 8, pressure is indicated on the vertical axis, and volume is indicated on the horizontal axis. Applicant's simulation of FIG. 8 is based on ignition occurring near TDC, before the transfer valve closes (as described above). Applicant's simulation is further based on a tank pressure of 70 bar. Compression events (FIGS. 7 A, B, and C) are represented by a solid line, while expansion events (FIGS. 7D through 7G) are represented in broken line. It is noted that the pressure within the cylinder does not exceed the pressure at the storage tank during the combustion phase. Thus, the rate of heat release is controlled by the motion of the piston and the opening of the transfer valve, rather than combustion chemistry.

FIGS. 9A and 9B, and this associated discussion, provide additional details of how the combustion phase proceeds in the above described scenarios. FIG. 9A shows the start of combustion, and FIG. 9B shows the quasi-stationary state that is reached a few milliseconds later. After spark plug 906 is energized (via control of microprocessor 200 through spark ignition control 225), combustion propagates as a flame front 912 moving outwardly from the spark. If transfer valve 102 is open at this time, the combustion will eventually stabilize as a flame front anchored by the valve 102 itself, optionally aided by recirculation enhancing features on the cylinder head or piston. The flame front 912 cannot travel further upstream because of the high velocity of the flow through the valve 102. Fuel injection ends before the transfer valve 102 closes, so that there is never the possibility of an undesirable flashback. This combustion pattern has the advantage of preventing engine knock altogether, because there is no location where premixed air and fuel is compressed adiabatically prior to ignition, thus allowing the use of high levels of boost and fuels with low octane number. Harmful emissions, such as those of nitrogen oxides, are also minimized because gas temperatures are smaller than in conventional engines where the charge does not leave the cylinders from start to end of the thermodynamic cycle.

During normal operation, the transfer valve 102 remains open for a short time, so that the air compressed in a single revolution will be spent over one or more expansions in order to maximize the amount of power produced and minimize the pressure at the end of each expansion, thus maximizing fuel economy. Applicant's simulation results show that optimal fuel economy in steady state is achieved with a six-stroke cycle, where two expansions follow a single compression. When the engine operates in steady state, there is no net storage of air into the tank so that the tank can be disconnected from the engine by a valve, or even eliminated. In such an embodiment, the transfer manifold itself serves as a buffer to accumulate compressed air and then deliver it to the cylinders that require it.

Figure 10:
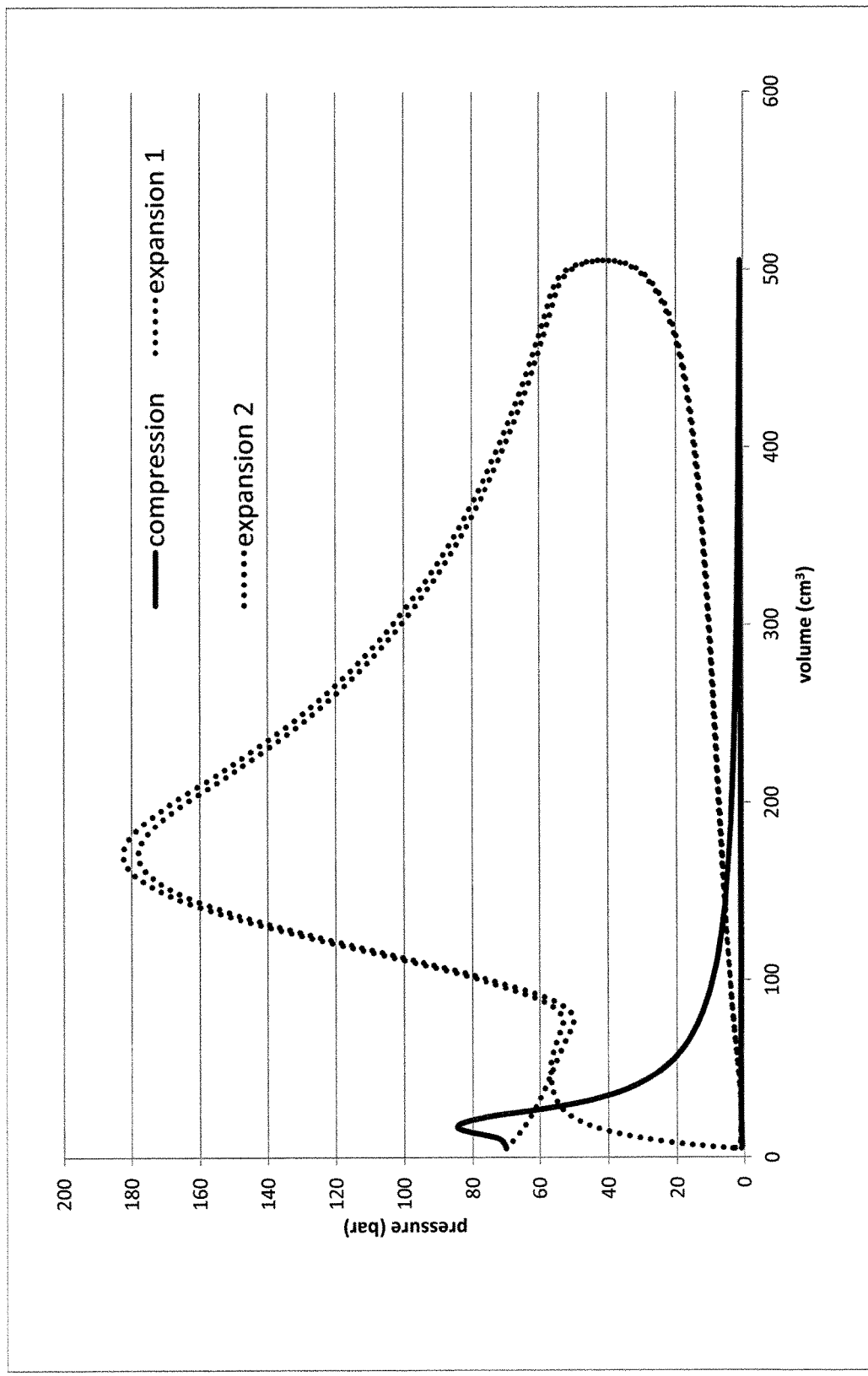
FIG. 10 shows a pressure-volume diagram of Applicant's simulations in which the transfer valve remains open for a relatively longer time period during combustion.

However, if there is a large demand for power, the transfer valve 102 can be left open a longer time, resulting in a much more powerful expansion at the expense of consuming some of the stored air. FIG. 10 shows Applicant's simulation results of such a scenario, wherein a pressure-volume diagram is provided with pressure on the vertical axis, and volume on the horizontal axis. In this scenario, two expansions and one compression are simulated. Ignition takes place at the time the transfer valve closes. According to Applicant's simulation, the power density in this scenario can be over ten times greater as compared to conventional prior art engines. The power output of embodiments of the present inventions is especially large if the air, which is hot immediately after compression, is allowed to cool down in the tank. This is because air density is inversely proportional to its absolute temperature, and thus cool air is denser and able to react with more fuel, resulting in more power. This cooling can be forced by a heat exchange interposed in the duct between the transfer manifold and the tank, but in many cases the natural cooling through the tank wall itself is sufficient.

It should be understood that, although Applicant's disclosure sometimes describes the operation of a compression cycle followed by an expansion cycle, the invention is not limited to any order of cycles. That is to say, microprocessor 200—using the above described configurations and commands—may cause two expansions to be follow one compression, which has the effect of increasing the effective expansion volume. Alternative patterns may include only expansions, only compressions, or any other pattern. Some patterns may cause a surplus of compressed air, which accumulates in storage tank 107. Other patterns may cause a deficit of compressed air, where the deficit is taken from the storage tanks. The surplus or deficit is a result of the ratio of compressions to expansions.

An important consideration in controlling the power delivered by the present inventions is the duration for which the transfer valve is open during the combustion phase. In other words, with respect to FIG. 7D for example, the longer that transfer valve 102 is open during the stroke, the more air, and thus more power, is delivered. Thus, the timing of the transfer vales is a primary factor in controlling the power produced by embodiments of the inventions. This is in distinction to conventional engines in the prior art, where power is controlled by varying the timing of intake valves, the position of a throttle plate before the intake manifold, or the amount of fuel injected into the cylinders. However, prior art engines do not include the ability to control power by varying the timing of a transfer valve (connected to a compression tank) during the combustion stroke.

The present inventions include computer instructions, configurations, and/or programs by which microprocessor 200 controls the timing of the transfer valve during the combustion phase (See FIG. 7D). As described above, the timing of the transfer valve 102 (specifically, the timing of closing the transfer valve) during the stroke can vary the power delivered. To determine the appropriate timing, embodiments of the inventions include a microprocessor 200 configured to obtain the current crank speed from crank speed sensor 230, obtain the instantaneous power demand 210 and compute the mechanical work to be produced in the next revolution or revolutions. Parallel to this, microprocessor 200 computes the difference between the current tank pressure (via sensor 202) and a desired tank pressure. Based on this, microprocessor 200 computes the mass of air to be stored in the tank 107 (or, to be extracted from the tank, in the case of a surplus) as soon as practicable.

The determination of whether a compression or an expansion is to take place during the next revolution is the result of a computation weighing the instantaneous power demand, the current pressure in the air tank, the desired smoothness of the power output, and other factors. It is contemplated that the computation model may range in complexity from a simple proportional control based on the required instant power and the desired tank filling (or emptying) rate; a two-point algorithm similar to those used in hybrid electric vehicles, where the controller aims to keep tank pressure within a maximum and minimum value by varying the filling rate; or a control algorithm that takes into account the time integral or derivative of tank pressure, instant power, and other state variables.

If microprocessor 200 determines the next phase to be an expansion, it also computes the timing of where in the combustion cycle the transfer valve 102 should close in order to achieve the required power output. As already discussed above, one aspect of the functionality of some embodiments of the inventions is the variable timing of the transfer valve 102 during combustion. The above-described calculations should be performed simultaneously, or as close to simultaneous as possible, and can be iterated until an optimal solution is determined. Thus, embodiments of the prevent inventions disclose a cylinder than can operate either in compression or in expansion, which is connected to an air storage tank, allowing embodiments of the inventions to achieve a large increase in power density over engines of conventional design. In turn, the present inventions may be used to make smaller cylinders, since cylinder displacement is typically determined by the maximum power that the engine must deliver. Smaller cylinders lead to smaller losses due to friction and pumping of gases, which results in an increase in fuel economy. Fuel economy is additionally improved by the larger effective expansion volume, due to the order in which the cycles may run.

By way of example, FIGS. 11A and 11B show flow charts of exemplary routines that microprocessor 200 may execute. FIG. 11A refers to an embodiment in which microprocessor 200 compression and expansion cycles are dynamically determined, and FIG. 11B refers to an embodiment in which a pre-specified pattern is followed. Turning first to FIG. 11A, at step 1101, microprocessor 200 measures the vehicle's speed, engine speed, pedal position, tank pressure, and crank position using vehicle sensors known in the art. At 1102, microprocessor executes the step of computing the desired power based on the gas pedal position and the vehicle's speed. Having determined the desired power, microprocessor 200, at step 1103, evaluates whether the desired power is achievable with compression cycle(s). If yes, then microprocessor proceeds with step 1105 to evaluate whether the tank 107 has a pressure below a set point. If so, then microprocessor 200 performs a compression cycle to increase the tank's pressure. If no, or if the desired power is not achievable with compressions (step 1103), then microprocessor proceeds to computer a transfer valve closing time (at 1104) and performs an expansion in the next cylinder.

In the embodiment disclosed in FIG. 11B, microprocessor 200 causes compressions and expansion to occur in a pre-set pattern. Applicant's simulations suggest that one example of an optimal pre-set pattern is to perform one compression followed by two expansions. At step 1120, microprocessor 200 measures the vehicle's speed, engine speed, gas pedal position, tank pressure, and crank position. Based thereon, at 1121, a desired power is computed based on the gas pedal position and the vehicle's speed. Proceeding to 1122, the microprocessor 200 computes the intake pressure from the tank pressure and the desired power, and, at 1123, computes the appropriate transfer valve closing time from the desired power and engine speed. A determination is made as to whether the cycle is completed, at 1124, and if it is not, the same results apply to the next cylinder. If the cycle is complete, the steps reset and start new (1126).

Applicant's inventions also include an alternative embodiment wherein the microprocessor is not configured to determine the next cycle, but instead, a predetermined pattern of cycles is provided. In some such embodiments, a predetermined pattern of cycles is one compression event, followed by two expansion events, thus covering a combined six strokes. This pattern may be continuously repeated during operation of the cylinder. Where this pattern is followed, microprocessor 200 is no longer required to evaluate, on a cycle by cycle basis, what cycle should follow. Applicant's simulation results indicate that this cycle pattern achieves many (but not all) of the same benefits. The same principles described above apply to such embodiments, however, with the difference being that it is not necessary to provide a microprocessor for determining the next cycle because the order of cycles is fixed. As a result, less demand is placed on the engine's electronic systems and sensors. In such an embodiment, it may still be desirable for a microprocessor to calculate the timing of the transfer valve because, as already described above, the timing of the transfer valve directly control power output. In such an embodiment, intake and exhaust valves may be mechanically actuated by cams, such as those known in the art. The need for a microprocessor to communicate with, and control, intake and exhaust valves 101, 103 is eliminated.

Instead, intake valve 101 and exhaust valve 103 may be controlled by cam(s), respectively, which cause intake valve 101 and exhaust valve 103 to open and close according to the timing principles described herein. That is to say, intake valve 101 is still causes to open during a compression cycle, but is controlled by a cam instead of by microprocessor 200. Similarly, in embodiments of the inventions, exhaust valve 103 is caused to open by a cam during the end of the combustion phase, allowing exhaust gases to escape the cylinder.

Such an embodiment has the advantage of being less costly to manufacture and maintain, because the microprocessor's computational requirements are reduced and also because the microprocessors control over the intake and exhaust valves are eliminated. However, such embodiments do not capture the full increase in power density and/or fuel economy relative to the above-described embodiments.

Likewise, an engine that is meant to deliver a constant power for a long period of time, as for instance in an aircraft or as an electrical generator, will end up with a constant state of fill in the air tank, so that the tank fulfills no useful purpose. In this case it will be best if the manifold connecting the transfer valves of the various cylinders has sufficient volume to dampen the pressure fluctuations caused by the flow of air into and out of it and eliminate the air storage tank entirely.

What is claimed:

1. An engine, comprising:
   at least one cylinder having a cylinder top, and a piston disposed within the at least one cylinder and connected to a crank;
   an intake valve, a transfer valve, and an exhaust valve each positioned at the cylinder top; wherein the transfer valve is in operable communication with a transfer manifold, and the transfer manifold is connected to a compression tank;
   a microprocessor operably connected to control the intake valve, the transfer valve, and the exhaust valve between an open position and a closed position;
   a crank position sensor in operable communication with the microprocessor and configured to signal a position of the crank to the microprocessor;
   a power demand sensor in operable communication with the microprocessor and configured to signal a current power demand to the microprocessor;
   a fuel injector in electronic communication with the microprocessor and positioned within the transfer manifold; and
   a spark ignition positioned within the at least one cylinder and in electronic communication with the microprocessor.

2. The engine of claim 1, wherein the microprocessor is adapted and configured to initiate a compression cycle by opening the intake valve so as to allow air to flow into the cylinder as the piston moves from a top dead center (TDC) position to a bottom dead center (BDC) position;
   closing the intake valve when the piston reaches the BDC position; and
   opening the transfer valve so as to allow compressed air to move to the compression tank as the piston returns to the TDC position.

3. The engine of claim 2, wherein the microprocessor is further adapted and configured to determine, subsequent to the compression cycle, whether to perform another compression cycle or a combustion cycle based on the current power demand.

4. The engine of claim 3, wherein the microprocessor is further adapted and configured to perform the combustion cycle by injecting fuel into the transfer manifold via the fuel injector; opening the transfer valve so as to cause the fuel from the transfer manifold and the compressed air from the compression tank to flow into the cylinder; and energizing the spark ignition.

5. The engine of claim 4, further comprising at an intake manifold connected to the intake valve and an exhaust manifold connected to the exhaust valve.

6. The engine of claim 5, wherein the at least one cylinder includes a second cylinder having a second intake valve connected to the intake manifold; a second transfer valve connected to the transfer manifold; a second exhaust valve connected to the exhaust manifold; and a second piston connected to the crank; wherein the second intake valve, second transfer valve, and second exhaust valve are in electronic communication with the microprocessor.

7. The engine of claim 6, wherein the microprocessor is configured to cause each cylinder to perform one compression cycle followed by two combustion cycles.

8. The engine of claim 1, wherein the compression tank is a 40 liter compression tank.

9. The engine of claim 1, wherein the transfer valve is a variable timing valve.

10. A method for performing compression and expansion in a single cylinder, the method comprising:
   establishing electronic communication between a microprocessor and an intake valve, a transfer valve, and an exhaust valve, wherein the intake valve, the transfer valve, and the exhaust valve are positioned on a top of the cylinder, and the cylinder contains a piston connected to a crank;
   connecting the transfer valve to a transfer manifold, and connecting the transfer manifold to a compression tank configured to store compressed air;
   establishing electronic communication between the microprocessor and a crank position sensor configured to determine a relative position of the piston within the cylinder;
   using the microprocessor to initiate a compression cycle by causing the intake valve to open so as to allow air to enter the cylinder when the piston is at a top dead center (TDC) position;
   moving the piston toward a bottom dead center (BDC) position;
   sensing when the piston reaches the BDC position using the crank position sensor;
   opening the transfer valve as the piston returns to the TDC position so as to allow compressed air to flow, via the transfer manifold, to the compression tank; and
   using the microprocessor to:
      initiate a combustion cycle by causing the transfer valve to open so as to allow the compressed air from the compression tank to enter the cylinder when the piston is at the TDC position;
      cause a fuel injector, positioned in the transfer manifold, to inject fuel through the transfer valve and into the cylinder; and
      cause a spark ignitor, positioned within the cylinder, to ignite a mixture of fuel and air.

11. The method of claim 10, further comprising: opening the exhaust valve so as to allow exhaust to escape the cylinder.

12. The method of claim 11, wherein the microprocessor is configured to cause the cylinder to perform one compression cycle followed by two combustion cycles.

13. The method of claim 10, wherein the transfer valve is a variable timing valve.

* * * * *